July 10, 1951

R. W. BROWN 2,560,024

METHOD OF MAKING FRICTION MATERIAL

Original Filed Oct. 14, 1942

Inventor
Roy W. Brown

By Ely & Frye
Attorneys

July 10, 1951 R. W. BROWN 2,560,024
METHOD OF MAKING FRICTION MATERIAL
Original Filed Oct. 14, 1942 2 Sheets-Sheet 2
Fig. 7.
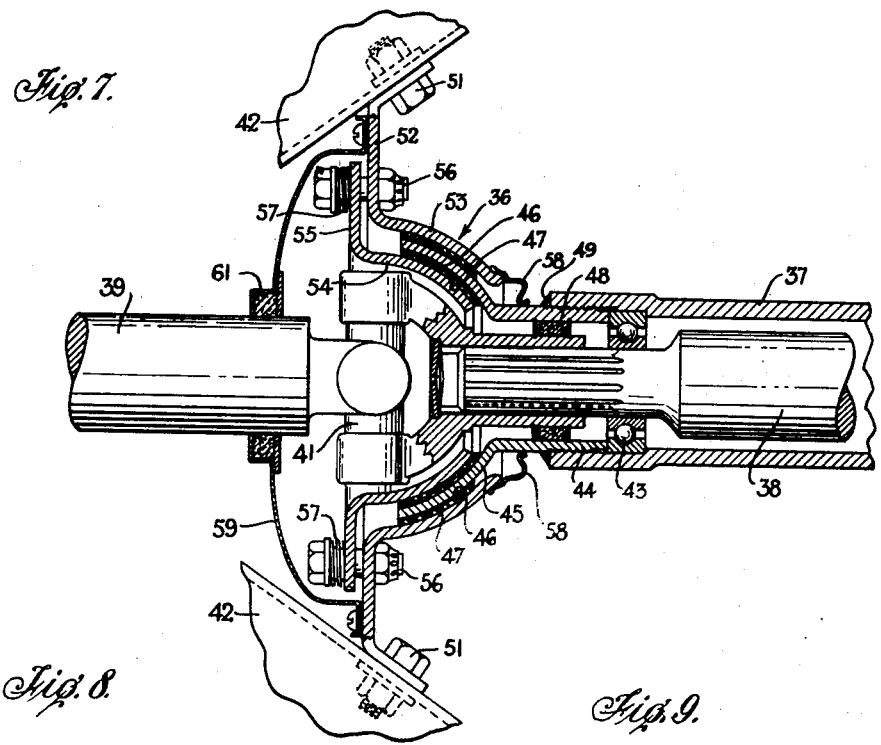
Fig. 8.
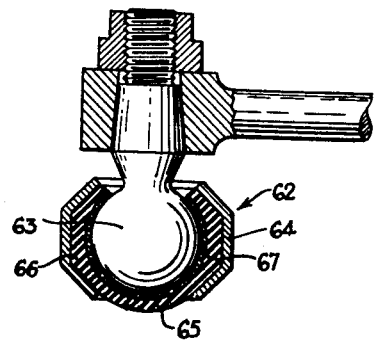
Fig. 9.
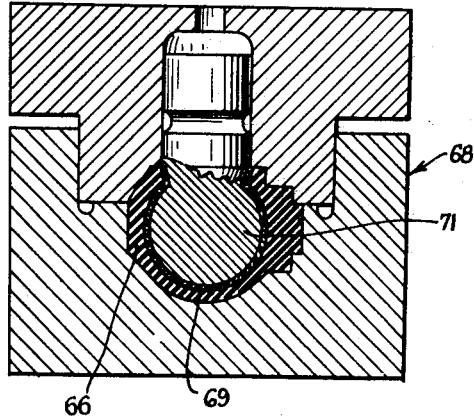
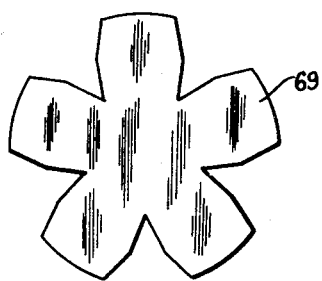
Fig. 10.
Inventor
Roy W. Brown
By
Ely & Frye
Attorneys Patented July 10, 1951

2,560,024

UNITED STATES PATENT OFFICE 2,560,024

METHOD OF MAKING FRICTION MATERIAL

Roy W. Brown, Akron, Ohio, assignor to The Firestone Tire & Rubber Company, Akron, Ohio, a corporation of Ohio Original application October 14, 1942, Serial No. 462,060. Divided and this application April 8, 1949, Serial No. 86,376

4 Claims. (Cl. 154—130)

1

This invention relates to friction devices and to friction material and lubricants therefor. The invention also relates to a method of making said friction material, lubricants and friction devices.

This application is a division of my copending application Serial No. 462,060, filed October 14, 1942, now Patent No. 2,537,629, which was a continuation in part of my applications Serial Nos. 236,693, filed October 24, 1938, now Patent No. 2,381,378, and 347,724, filed July 26, 1940, now Patent No. 2,324,984.

It is an object of the invention to provide an improved friction device having a dynamic coefficient of friction which is greater than its static coefficient of friction.

Another object is to provide a method of making an improved friction device.

Another object is to provide a friction material having a surface which exhibits a coefficient of kinetic or dynamic friction greater than its coefficient of static friction, and to provide a method of making said friction material.

The above and further objects not now specifically enumerated will be manifest in the following description of the invention when considered with the accompanying drawings, in which:

Figure 7 is a horizontal sectional view of a universal friction device produced by the invention, incorporated in the torque tube of an automobile;

Figure 8 is a sectional view of another friction device produced by the invention;

Figure 9 is a sectional view illustrating a mold and method used in making the resilient bushing of the friction device of Figure 8; and Figure 10 is a plan view of the fabric lining for the resilient bushing of the friction device of Figure 8 before being inserted into the mold of Figure 9.

The invention contemplates the production of a friction device having the desirable characteristics set forth in the objects, as well as a suitable friction material for such device. The novel device, which may partake of any conventional external appearance or shape, is distinguished from the prior art by the fact that its coefficient of kinetic or dynamic friction is greater than its coefficient of static friction; the term, static friction, is used herein to relate to the friction between two bodies in contact with each other immediately following initiation of motion of one of said bodies relative to said other body, and the term, kinetic or dynamic friction, is used in the usual sense in which it is employed by those skilled in the art of friction devices. The friction device comprises a bearing of which the novel friction material provides one bearing surface. The friction material comprises a porous flexible layer, such as a textile fabric, and preferably is backed by an insulating layer of a resilient, elastic substance, such as rubber, synthetic rubber or other rubber-like substance. The exposed surface of the porous layer, opposite the resilient, elastic backing, provides the bearing surface of the friction material. The porous layer of the friction material is preferably impregnated with and lubricated by a novel lubricating composition, concerning which a detailed disclosure will be presented hereinafter.

Figure 1:
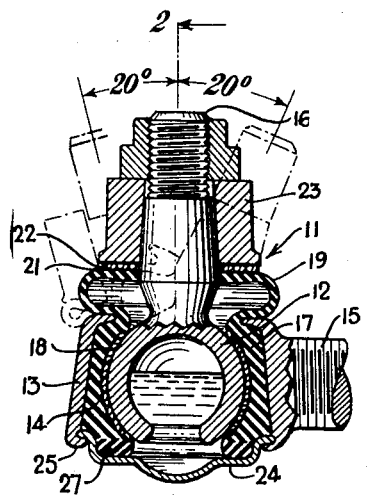
Figure 1 is a sectional view of one form of friction device produced by the invention.
Figure 2:
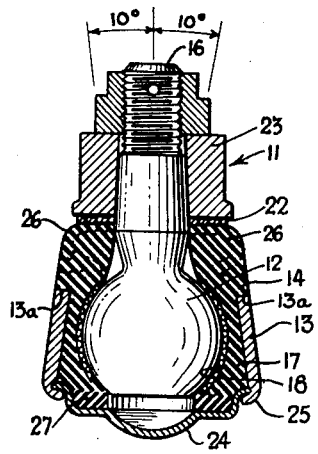
Figure 2 is another sectional view, taken on line 2—2 of Figure 1.

Referring to the drawings, in which similar numerals refer to similar parts throughout the several views, Figures 1 and 2 are sectional views of a friction device, in the form of a pivotal joint 11. This type of joint is particularly adapted for use in the steering linkages of vehicle wheels, although it may advantageously replace other mechanical linkages. The pivotal joint 11 comprises an inner bearing member 12, illustrated as a hollow ball, an outer housing 13, and an intermediate bushing 14. The ball member 12 may take various forms so long as it has a substantially spherical bearing surface, and may be solid rather than hollow. The outer casing may also take various forms, being an integral part of the steering cross link 15, as shown, or an independent structure. The bearing member 12 has an integral stud 16 which may be attached to one of the pivoted parts. The bushing 14 comprises a resilient outer layer of rubber 17, or material having substantially similar properties, and an inner lining 18.

The lining 18 is preferably made of a porous, flexible material impregnated with a lubricant sufficient in amount and having such characteristics that the joint will be properly lubricated for the full useful life of the joint. The flexibility of the lining 18 and the resiliency of the rubber layer 17 impart to the joint noise and vibration insulating properties and allow slight irregularities on the inner bearing member 12, thus eliminating the necessity of machining said member.

The member 12 may therefore be made of an unmachined, stamped or forged metal part. The rubber layer 17 of the bushing 14 has an integral extension or skirt 19 extending beyond the housing 13 and surrounding the shank of the stud 16 of the inner bearing member 12. The skirt 19 terminates in a flange 21 carrying a lubricated disk 22 of lining material, which is a composition similar to the lining 18 of the ball joint. The skirt and flange lining material are resiliently urged against the under surface of an eye 23 on the end of a steering link or other member (not shown), which is connected to the link 15 by means of the joint 11, in order to provide a suitable dirt seal to exclude foreign matter from the ball joint.

As will be pointed out in further detail hereinafter, the bushing 14 is molded and vulcanized to a predetermined form, size and shape substantially complemental to the inner contour of the housing 13. Then the ball joint and molded bushing are inserted through the aperture in the lower side of the housing. A plate-like disk 24 is placed beneath the joint and bushing, and a flange 25 is peened over to retain the disk 24 in fixed position and seal the lower portion of the joint. If desired, the hollow space formed by the hollow ball 12 and the disk 24 may be filled with a reserve supply of lubricant during the assembly of the joint.

The lining 18 is preferably fabric which has been impregnated with the novel lubricant of the invention, and the backing layer 17 is preferably vulcanized rubber or synthetic rubber, whereby there is produced in the joint, when the lining is in frictional contact with the metal ball 12, a dynamic coefficient of friction that is greater than the static coefficient of friction of the joint. This novel friction characteristic of the joint is very important and desirable in steering linkages, since it greatly aids the driver of the vehicle in maintaining a desired course at high speeds despite intermittent external side forces due to wind and shifting of the vehicle on account of uneven road conditions. With steering linkages having this peculiar friction characteristic there is substantially no extra "breakaway" effort required to initiate steering control—there is less effort required to initiate steering movement than is necessary to maintain steering movement. Accordingly, the driver needs only to apply a steady, smooth force while changing the steering angle of the dirigible wheels of the vehicle, whereby he is able to maintain a predetermined course at high speed without fatigue.

For the purpose of providing a stable and rattle-free joint, means may be provided to urge the shank of the stud 16 to a central position relative to the outer housing 13. To this end, the outer housing may be provided with recesses 13a at opposite sides thereof and adapted to receive lugs 26 which are integral with the skirt 19 of the bushing. The engagement of the lugs with the recesses prevents relative rotational movement between the outer housing and the bushing, and therefore prevents chafing of the rubber layer thereof.

The lower end of rubber layer 17 is provided with an annular ring portion 27 of rubber stock softer, when vulcanized, than the layer 17 itself. The line of demarkation between these two stocks is indicated by the cross-hatching. During the manufacture of the rubber part the thickness and resiliency of this ring may be altered, so that when disk 24 is fixed in predetermined assembled relation the bushing 14 will be placed under a predetermined amount of compression, for the purpose of providing a snug fit between the lining 18 and the ball 12. It is to be understood in this connection, however, that the rubber part 17 is molded to a shape substantially complemental to the inside contour of the housing before assembling, and that the amount of compression of the assembled joint is only sufficient to maintain a stable joint. The relative position of the ball with respect to the casing is determined by the shaping of the molded rubber part and not primarily by the amount of compression to which the lining is subjected.

As shown, the pivotal connection 11 is capable of moving farther in the plane illustrated in Figure 1 than in the plane at right angles thereto, illustrated in Figure 2. The necessity for this movement in one plane and the limitation in the other plane will be understood when it is remembered that greater angular movement is necessary in some planes than in other planes in order to accommodate all of the steering movements for the various possible positions of the wheels relative to the body of the vehicle.

Figures 3, 4, 5 and 6 illustrate the method of making the pivotal joint shown in Figures 1 and 2. Although bushing 14 appears to be round in Figures 1 and 2, it is to be understood that where the pivotal connection is to be installed in a steering linkage where the pivotal movement in one plane is to be greater than in another plane at right angles thereto, the skirt or extension portion 19 of the bushing is made out-of-round or substantially elliptical.

Figure 3:
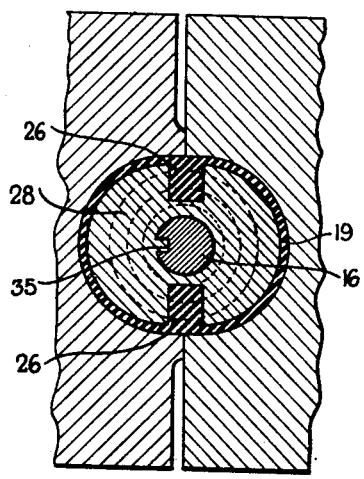
Figure 3 is a sectional view taken on line 3—3 of Figure 4, illustrating the mold and method used in making the resilient bushing for the device of Figures 1 and 2.

In Figure 3, where the method of molding the bushing is shown, this modified out-of-round extension or skirt is shown. It will be understood that the methods of making a round skirt or an out-of-round skirt are exactly the same except for the shape of the mold cavity. It is possible, of course, to permit greater movement in one plane than another by using an annular top on the outer housing of the joint and an annular bushing to fit, but it would be necessary to have the diameter sufficient to accommodate the maximum angular movement. In some instances this arrangement might cause a sacrifice in stability of the joint. Hence, the preferred, elliptical modified form of bushing is shown in Figure 3, the skirt part 19 being vulcanized in the out-of-round shape while the lower part of the bushing is vulcanized in the round shape and size it will have in the assembly. The purpose of this arrangement is to permit more movement in the plane shown in Figure 1 than the permissible movement in the plane shown in Figure 2, the latter plane being that of the lugs 26.

Figure 5:
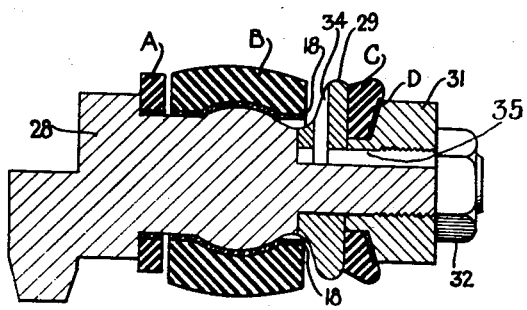
Figure 5 is a sectional view of the assemblage of parts prior to insertion in the mold of Figures 3 and 4.

Referring to Figure 5, a rubber ring A may be made by suitable known methods, such as by forming a tube and then cutting it into narrow rings, or by sheeting and dieing rings of the desired thickness and resiliency. The thickness and resiliency of the ring A, which corresponds to the annular ring 27 of Figures 1 and 2, and becomes an integral part of the bushing of the joint after vulcanization, will determine the precompression of the bushing when assembled in a joint.

Figure 6:
Figure 6 is a sectional view of a plastic or elastic ring prior to its incorporation in the resilient bushing of the friction device of Figures 1 and 2.

Next, a suitable bearing fabric 18 is prepared by coating one side thereof by dipping in, or otherwise impregnating with, an adhesive composition which increases the adherence of the fabric to rubber. This fabric strip is cut into the proper length and width and wrapped around the enlarged spherical portion of a mandrel 28, the length of the fabric strip being such that the ends overlap by an amount between one-eighth and one-fourth of an inch. The overlapping portions of the fabric are suitably cemented together to hold them in position. Thereafter, the rubber cylindrical member B is placed around the fabric. This may be done by wrapping a section of gum strip over the fabric or alternatively, if desired, preparing a tube of rubber stock and slipping the same over the fabric 18. The mold insert 29 is then assembled on the extension of the mandrel 28. The rubber part C, shown in unstressed condition in Figure 6, is prepared by tubing and cutting, or by sheeting and dieing a rubber stock to produce a ring similar in shape to part A, except that part C is somewhat greater in thickness. Thereafter, a fabric disk D, which has been prepared by dipping one side thereof in, or otherwise impregnating a suitable material to cause it to adhere to rubber, and the other side of which has been impregnated with a suitable lubricant is placed against the rubber ring C with the adhesive impregnated side against the ring C. The collar 31 is then placed on the extension of the mandrel 28, and a nut 32 is tightened up in any suitable manner to compress the part C into the shape shown in Figure 5. In assembling the parts C and D it is important that they be arranged in concentric relation. To hold the mold insert 29 rigidly in position on the mandrel 28 a key 33 is placed in a slot 34 of the insert and pushed into a slot 35 on the shank of the mandrel 28.

Figure 4:
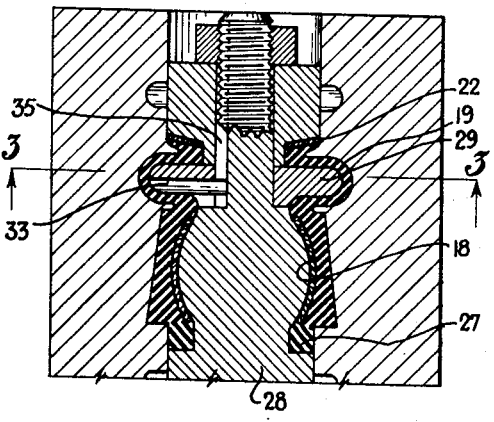
Figure 4 is another sectional view illustrating the mold and method used in making the resilient bushing for the device of Figures 1 and 2.

The mandrel 28, with the component parts of the bushing assembled thereon, is then placed in the mold, as shown in Figures 3 and 4, and vulcanized. During the vulcanization process the parts A, B, and C are vulcanized into an integral unit, the space between the parts B and C becoming bridged by the flow of rubber in the cavity of the mold to form the extension or skirt 19 and the lugs 26 of the bushing 14. The vulcanized bushing is thereafter removed from the mold, and the mandrel 28 and other mold insert parts are removed therefrom. Before the temperature of the bushing has dropped below approximately 140° F. the exposed fabric surfaces of the lining 18 and disk 22 are lubricated with a suitable lubricant, such as the novel lubricant comprising graphite and castor oil, hereinafter described. Alternatively, the bushing may be allowed to cool, if desired, and treated with melted solid lubricant to impregnate the exposed fabric surfaces, by the preferred lubricant impregnating technique described in detail hereinafter.

Another embodiment of the friction device of the invention is a universal friction device 36 shown in Figure 7 as incorporated in the torque tube of an automobile. Within the torque tube 37 is a shaft 38 that extends to the differential mechanism in the axle housing (not shown), said shaft 38 being connected to a shaft 39 from the automobile engine (not shown) through the agency of a universal joint 41 of the usual well-known construction, said universal joint being positioned adjacent to the intersection of the automobile frame cross braces 42, 42. There is a ball bearing 43 positioned between the torque tube 37 and the shaft 38 adjacent to universal joint 41. Threaded into the forward end of the torque tube 37 and abutting the outer race of bearing 43 is the tubular, rear portion 44 of a movable element of the friction device 36, the forward end portion of said element being of concave-convex shape, as shown at 45, and positioned concentrically with relation to the center of the universal joint 41. Vulcanized to the concave and to the convex surfaces of portion 45 are respective layers of resilient rubber composition 46, 46 and bonded to the latter are facings 47, 47 of a porous material, preferably textile fabric impregnated with the novel lubricant described in detail hereinafter. The arrangement is such that the rubber layers 46 constitute a resilient backing between the friction facings 47 and the surfaces of the concave-convex structure 45. There is an annular sealing gasket 48 interposed between portion 44 of the movable element and the enclosed hub portion of the universal joint 41. Preferably, the tubular portion 44 is permanently secured to the torque tube 37, as by the welding indicated at 49.

Secured to the cross braces 42 of the frame, as by means of bolts 51, is an annular plate 52 that is positioned substantially in the medial plane of rotation of the universal joint, and formed about the axial aperture of said plate is a concave-convex formation 53 that is disposed exteriorly of the similar shaped structure 45 and is concentric with the center of the universal joint. Normally the friction facing 47 on the convex side of portion 45 is in abutting relation to the concave face of formation 53, the latter constituting a socket for the portion 45. Positioned concentrically within the latter is an annular, concave-convex shell 54 that encircles the universal joint and has its convex face in abutting relation to the friction facing 47 on the concave face of portion 45. Shell 54 is formed with a radially outwardly extending marginal flange 55 that is disposed parallel to plate 52 and in spaced relation thereto, said flange being secured to said plate by a plurality of bolts 56, 56. There is a coiled compression spring 57 between the head of each bolt 56 and the adjacent face of flange 55, the arrangement being such as to urge the shell 54 axially toward the portion 45, with the result that there is at all times good frictional contact between the friction facings 47 on both sides of portion 45, and the concave-convex structures 53 and 54 that engage said facings.

A flexible annular sealing ring 58 of rubber or similar material embraces the tubular structure 44 of the movable member of the device and the adjacent margin at the inner circumference of the structure 53 to seal the device from dirt and other foreign materials and to prevent the possible escape of lubricant between the said members. At the opposite side of the device is a closure consisting of an annular dished plate 59 that is secured, at its outer circumference, to the plate 52, and at its inner circumference carries an annular sealing gasket 61 that embraces the drive shaft 39. When the closure plate 59 is removed, the heads of bolts 56 are exposed so that by the adjusting of said bolts the force of springs 57 may be varied to alter the friction between the friction facings 47 and the structures that engage them. The arrangement is such that any relative movement between the running gear of the automobile and the frame thereof, such as torque and thrust reactions, are translated through the torque tube to the friction device at the universal joint, which device is universal in its ability to offer determinate and resilient frictional resistance to said relative movements. Because of the utilization of the novel friction material 46—47 in this friction device, there is no tendency for the latter to bind, and it efficiently dampens the said relative movements, whereby the automobile proceeds over a rough road more smoothly.

The friction material for the friction device 36 is made by adhering one face of the porous facing material 47 to the resilient backing material 46, bonding the surface of the backing material opposite the facing material to the concave and convex surfaces of the portion 45, as shown, and then impregnating the exposed surfaces of the facing material 47 with the novel lubricant. In a preferred method of making the preferred construction of device 36, a textile fabric is utilized for facing material 47, and this fabric is adhered to a suitable rubber composition by calendering. The friction material 46—47, so prepared, is then positioned upon the opposite surfaces of portion 45, as indicated in Figure 7, and bonded thereto, preferably by vulcanization; the surfaces of the metal portion 45 are preferably treated to improve the adhesion of the rubber layers 46 thereto, as by brass plating and/or coating with an adhesive cement. After vulcanization of the rubber layers 46, the exposed surfaces 47 are impregnated with the novel lubricant, as in the preferred manner hereinafter described.

A further modification of the friction device is shown in Figure 8, in which a pivotal joint 62 comprises a ball-shaped inner bearing member 63 and an outer casing 64, the latter being simply and cheaply made of stamped sheet metal. Between the bearing member and the casing is a bushing 65 of the novel friction material, said bushing comprising a resilient outer layer of rubber 66, or material having substantially similar properties, and an inner lining 67, preferably of textile fabric. The bushing 65 is similar in function and operation to the bushing 14 of the joint 11 of Figures 1 and 2. The joint 62 is simpler than the joint 11 in comprising a cheap, independent casing 64, which may be pressed around the assembled bushing and bearing member. The ball joint 62 may pivot throughout a wide range.

The bushing 65 is molded in a suitable mold 68, shown in Figure 9, after the fabric 69, of the friction material, and a suitably shaped rubber stock, for forming layer 66, have been assembled on a suitable mandrel 71. Figure 10 shows the "orange peel" shape in which the fabric 69 is preferably cut before it is assembled in the mold. During the early stages of vulcanizing the bushing the rubber stock flows to fill out the mold cavity and assumes the shape shown in Figure 9. The vulcanized bushing is then preferably treated in a suitable manner to impregnate the exposed surface of the fabric 69 with the novel lubricant, before the bushing, bearing member and casing are assembled.

LUBRICANT

It is the function of the friction material lubricant to prolong the life of the material and of a friction device embodying the same, and to impart smoother operation to the device without destroying the novel friction characteristics thereof. It is also desirable that the lubricant shall have no appreciably deleterious effect on the rubber or rubber-like portion of the friction material, and that the lubricant shall not promote any corrosion of the metal part or parts of a friction device but shall actually protect the same from corrosion. To these ends the novel lubricant comprises a basic ingredient which is an efficient lubricant, which does not swell or otherwise deleteriously affect vulcanized rubber or synthetic rubber, and which contains no appreciable quantity of a substance that may promote the corrosion of metal used in bearing or housing parts of a friction device.

A raw castor oil selected to contain a low fat acid content has been found to possess the qualities desired for the basic ingredient of the lubricant. This preferred castor oil is of a quality equal to a castor oil suitable for medicinal uses. A part or all of the castor oil of the lubricant may be replaced by derivatives of castor oil. For example, the viscosity and pour point of the lubricant may be lowered by utilizing acetylated castor oil. Also, the viscosity of the lubricant may be increased by employing hydrogenated castor oil in the lubricant. Other lubricating substances, besides castor oil derivatives, may be added to the lubricant, such as flake or colloidal graphite, various waxes, and modifiers and other special materials which specifically improve the properties of the lubricant.

Example 1

An example of a suitable liquid lubricant is a mixture of flake graphite and colloidal graphite suspended in castor oil. Such lubricant may be prepared by suspending, for example, one part by weight of flake graphite in approximately 50 parts of a commercial preparation of colloidal graphite in castor oil. Such preparation suitably contains 10 per cent of colloidal graphite and 90 per cent of raw castor oil of the quality indicated above. The colloidal graphite functions in a friction device to penetrate to all portions of the device accessible to the lubricant and to aid the castor oil in efficiently lubricating all moving surfaces contacting the bearing surface of the friction material impregnated with the lubricant. The flake graphite fills the pores in the bearing surface of the friction material to provide a more uniform bearing surface thereof and to aid in lubricating said surface. For best results the friction material should be impregnated with this liquid lubricant while the material is at a temperature above 140° F. and while it is substantially dry—free from water or oil. This impregnation can be conveniently carried out, in practice, on the friction material by impregnating the freshly vulcanized or molded material or bushing before the temperature of the part has dropped below 140° F.

Example 2

An example of a solid or substantially solid lubricant, which is better suited to many friction devices than a liquid lubricant, may be prepared by adding certain solid or semi-solid materials, preferably of a waxy nature, to a castor oil-graphite composition similar to the preceding liquid lubricant. A suitable solid lubricant may contain the following ingredients:

| | Per cent by weight |
|---|---|
| Beeswax | 24 |
| Lanolin | 24.5 |
| Castor oil | 20 |
| Flake graphite | 0.5 |
| 10% colloidal graphite-90% castor oil | 25 |
| Metallic soaps mixture | 6 |

The novel lubricant possesses thixotropic properties, whereby it acts as a solid at ordinary atmospheric temperatures and under low stress conditions but acts as a liquid at localized regions in a bearing when relatively high stresses are brought to bear upon it. Thus, the lubricant does not liquify to the point of flowing out of the joint or friction material but only to the extent of providing good lubrication to the bearing. The lubricant possesses this desirable lubricating characteristic even at very low temperatures. The waxy ingredients, beeswax and lanolin, of the lubricant are compatible with the other ingredients thereof and are water insoluble.

The metallic soaps mixture is essentially composed of aluminum soaps, the term "soaps" being used broadly, said soap being dispersible in castor oil or a castor oil derivative. A preferred composition is a special aluminum soap composition dispersible in castor oil. An example of such composition is a dispersion of approximately 50 per cent of the aluminum-containing reaction product of a mixture of an aluminum compound, sulfuric acid and the fats normally present in raw castor oil, and approximately 50 per cent of castor oil. The metallic soaps mixture is compatible with the other ingredients of the lubricant and is insoluble in water. The mixture improves the lubricating film strength of the lubricant and prevents it from losing its high lubricating efficiency at very low temperatures, by tending to inhibit the hysteresis of viscosity of the castor oil or castor oil derivative present in the lubricant. The mixture also increases the viscosity of waxes, such as beeswax and lanolin, at temperatures above their melting points, whereby the lubricant does not tend to flow from a bearing utilizing the same when the bearing temperatures are high.

The above solid lubricant may suitably be liquified by heating to 200–225° F. for impregnating friction material.

*Example 3*

A further example of a solid lubricant, and one that is preferred for general usage in the friction material and devices produced by the invention, possesses approximately the following composition:

| | Per cent by weight |
| --- | --- |
| Calcium dichlorostearate | 1.0 |
| Flake graphite | 0.5 |
| 10% colloidal graphite-90% castor oil | 30.3 |
| Metallic soaps mixture | 4.0 |
| Hydrogenated castor oil | 63.7 |
| Oxidized and polymerized castor oil | 0.5 |

The flake graphite, colloidal graphite-castor oil and metallic soaps mixture have already been described in connection with earlier examples of the lubricant. The hydrogenated castor oil is a hard, waxy material, compatible with the other ingredients of the lubricant and unaffected by water or petroleum products. This waxy substance makes the lubricant substantially solid at ordinary atmospheric temperatures and is an effective lubricant.

The calcium dichlorostearate is a special additive or modifier functioning to improve the lubricating film strength of the lubricant, to increase the viscosity of the same at high temperatures and substantially to inhibit the hysteresis of viscosity of the lubricant at low temperatures. This calcium compound cooperates with the special aluminum soap composition of the metallic soaps mixture to impart modified properties to the lubricant in addition to the properties expected by the addition of each modifier singly. In other words, these two modifiers produce more than an additive effect when combined in the lubricant.

The oxidized and polymerized castor oil is a viscous material, which may be sticky and have a spongy structure. It may be prepared by heating and blowing castor oil. This modified castor oil is very effective in controlling the friction characteristics of the lubricant, since a very small proportion of it in the lubricant imparts increased friction properties thereto. This lubricant additive also tends to increase the ratio of the static friction/dynamic friction of the lubricant, whereby it is possible to prepare a lubricant having better balanced frictional properties throughout a wide temperature range. Thus, for instance, the lubricant in this example, by reason of the presence of the modified castor oil therein, possesses substantially the same desirable frictional characteristics at temperatures below 0° F. as it possesses at higher and more normal atmospheric temperatures.

The lubricant of this example is insoluble in water, petroleum products and vulcanized rubber. It is a hard wax at room temperatures, softens appreciably around 140° F. and is thixotropic. Beyond its melting point of approximately 186° F. it is liquid, having excellent film strength and wetting properties. This combination of properties prevents wastage of lubricant by flow from the bearings or from mechanical abrasion incidental to immersion in water and dirt, and when loaded dynamically it provides adequate lubrication. Actual tests have indicated that the coefficient of friction of a friction device lubricated with this lubricant decreases at temperatures below 32° F. Thus, for example, a vehicle employing the preferred type of lubricant in steering link joints is more easily steered in cold weather than in temperate weather. The lubricant, by reason of its physical properties enumerated above, will normally remain in friction material impregnated therewith for the useful life of the friction device embodying the friction material.

*Example 4*

Another example of a preferred solid lubricant, which is similar to the lubricant of Example 3 except that it contains no graphite, is a composition having the following formula:

| | Per cent by weight |
| --- | --- |
| Calcium dichlorostearate | 1.0 |
| Castor oil | 31.0 |
| Metallic soaps mixture | 4.0 |
| Hydrogenated castor oil | 63.5 |
| Oxidized and polymerized castor oil | 0.5 |

This lubricant is a thixotropic, waxy material having substantially those properties set out with respect to Example 3. It is especially suited for use in bearings in which graphite is considered objectionable. It is also light in color, as compared with graphite-containing lubricants, and this property may sometime be an advantage in certain applications of the lubricant.

The preferred lubricant of Examples 2, 3 and 4 may be generically expressed in the following formula, in parts by weight, wherein fractional parts are disregarded in the case of the major ingredients:

| | |
| --- | --- |
| Castor oil | 29 to 46 |
| A waxy lubricant of the group consisting of hydrogenated castor oil, beeswax and lanolin | 48 to 64 |
| An aluminum soap | 2 to 3 |

IMPREGNATING FRICTION MATERIAL

A preferred method of impregnating the friction material with the lubricant will now be briefly described. This method gives uniformly satisfactory impregnation with any of the specific types of lubricants disclosed above, and is especially effective with the solid lubricants of Examples 2, 3 and 4.

The molded friction material, in which the rubber or rubber-like layer is vulcanized or cured, is carefully protected from coming into contact with water, steam or petroleum products, especially oils and greases. The material is actually impregnated in the liquefied lubricant contained in a steam heated kettle designed to maintain the temperature within a definite range to insure uniform impregnations; a temperature of 200–220° F. has been found satisfactory for lubricants similar to those disclosed in Examples 2, 3 and 4. The kettle is preferably provided with means to maintain a constant liquid level above the parts being impregnated and means for circulating the liquefied lubricant over around the said parts. The parts are preferably suspended in the lubricant in the kettle by means of a centrifuge basket, within which the parts are positioned. An impregnation time of approximately 15 minutes has been found to be satisfactory for a variety of differently constructed parts, but a variation in this figure may be desirable for specific lubricants or friction materials.

The completely impregnated parts are then cleared of excess lubricant by removing the basket containing the parts from the kettle and immediately centrifuging them for a short period of time, suitably a minute or two. The impregnated friction material parts are then ready for assembling in the friction devices for which they have been designed.

From the foregoing discussion it is seen that the invention relates to the production of any friction device or friction material possessing a coefficient of kinetic or dynamic friction which is gretaer than its coefficient of static friction. The friction material possesses this friction characteristic, even without the aid of the novel lubricant, when it comprises a layer of a porous bearing material backed by an insulating layer of a resilient, elastic material. Examples of this type of friction material includes a structure comprising a layer of textile fabric adhered to a backing layer of vulcanized or cured rubber or synthetic rubber. The preferred novel lubricant possesses such friction characteristics that it may impart to a friction material a coefficient of kinetic friction greater than its coefficient of static friction, even though the friction material does not comprise a resilient, elastic backing layer. For example, friction material consisting of a layer of textile fabric directly backed by a rigid casing or housing of a friction device shows, when impregnated with a preferred lubricant, e. g. the lubricant of Example 3, a coefficient of kinetic friction which is greater than its coefficient of static friction.

As an indication of the specific friction characteristics of a preferred friction material, one example is hereby given. A friction material comprising a layer of woven cotton fabric adhered to a backing layer of vulcanized rubber was impregnated with a lubricant similar to the lubricant of Example 2. The impregnated material was found to possess a ratio of kinetic/static friction of approximately 3/1.

Wide variations in the design of the friction device and in the specific nature and proportions of the ingredients of the lubricant are included within the scope of the invention, as will be apparent to those skilled in the art, who may make such variations in order to attain desired specific results.

What is claimed is:

1. The method of making friction material comprising calendering a vulcanizable elastic composition into one side of a flexible friction material, vulcanizing said vulcanizable composition to a metal backing member, and impregnating the exposed uncalendered side of said friction material with a liquefied lubricant.

2. The method of making a friction device comprising calendering a vulcanizable elastic composition into a fabric material, vulcanizing said composition to a metal backing member, and impregnating the uncalendered side of said fabric with a liquefied composition of graphite and castor oil.

3. The method of making friction material comprising adhering one face of layer of a flexible, porous bearing material to an insulating layer of a vulcanizable resilient, elastic substance, vulcanizing the insulating layer to a metal backing member, and impregnating the exposed face of the bearing material with a liquefied lubricant.

4. The method of making friction material comprising adhering one face of a layer of a flexible, porous bearing material to an insulating layer of a vulcanizable resilient, elastic substance, vulcanizing the insulating layer to a metal backing member, and impregnating the exposed face of the bearing material with a liquefied thixotropic lubricant having substantially the following composition in parts by weight:

| | |
|---|---|
| Castor oil | 29 to 46 |
| A waxy lubricant of the group consisting of hydrogenated castor oil, beeswax and lanolin | 48 to 64 |
| An aluminum soap | 2 to 3 |

ROY W. BROWN.

REFERENCES CITED

The following references are of record in the file of this patent:

UNITED STATES PATENTS

| Number | Name | Date |
|---|---|---|
| 1,430,143 | Barefoot | Sept. 26, 1922 |
| 1,801,666 | Geer | Apr. 21, 1931 |
| 2,026,272 | Danser | Dec. 31, 1935 |
| 2,246,101 | McEnany | June 17, 1941 |

FOREIGN PATENTS

| Number | Country | Date |
|---|---|---|
| 348,600 | Great Britain | May 6, 1931 |